United States Patent
Bonville, Jr. et al.

[11] Patent Number: 6,159,256
[45] Date of Patent: Dec. 12, 2000

[54] METHOD FOR DESULFURIZING A FUEL FOR USE IN A FUEL CELL POWER PLANT

[75] Inventors: Leonard J. Bonville, Jr., Marlbrough; Charles L. DeGeorge, Suffield; Peter F. Foley, Manchester; Jay Garow, Vernon; Roger R. Lesieur, Enfield; John L. Preston, Jr., Hebron; Donald F. Szydlowski, Ellington, all of Conn.

[73] Assignee: International Fuel Cells, LLC, So. Windsor, Conn.

[21] Appl. No.: 09/439,602

[22] Filed: Nov. 12, 1999

Related U.S. Application Data

[62] Division of application No. 09/104,254, Jun. 24, 1998.

[51] Int. Cl.[7] .............................. B01J 7/00; C10G 29/00; C10J 1/00
[52] U.S. Cl. ............................................. 48/61; 208/244
[58] Field of Search ..................... 48/61, 127.1, 127.9; 422/187, 188, 198, 199, 202; 585/616; 208/244

[56] References Cited

U.S. PATENT DOCUMENTS

| | | | |
|---|---|---|---|
| 4,923,836 | 5/1990 | Kokayeff et al. | 502/74 |
| 5,114,562 | 5/1992 | Haun et al. | 208/89 |
| 5,507,939 | 4/1996 | Russ et al. | 208/65 |
| 5,882,614 | 3/1999 | Taylor, Jr. et al. | 423/230 |

*Primary Examiner*—Marian C. Knode
*Assistant Examiner*—Alexa A. Doroshenk
*Attorney, Agent, or Firm*—William W. Jones

[57] ABSTRACT

A fuel processing system is operable to remove substantially all of the sulfur present in an undiluted hydrocarbon fuel stock supply used to power a fuel cell power plant in a mobile environment, such as an automobile, bus, truck, boat, or the like, or in a stationary environment. The power plant hydrogen fuel source can be gasoline, diesel fuel, naphtha, light hydrocarbon fuels such as butane, propane, natural gas, or other like fuels which contain relatively high levels of organic sulfur compounds such as mercaptans, sulfides, disulfides, and the like. The undiluted hydrocarbon fuel supply is passed through a nickel desulfurizer bed wherein essentially all of the sulfur in the organic sulfur compounds react with the nickel reactant, and are converted to nickel sulfide while the desulfurized organic remnants continue through the remainder of the fuel processing system. The system does not require the addition of steam or a hydrogen source to the fuel stream prior to the desulfurizing step. The system operates at relatively low temperatures and can be used to desulfurize either a liquid or a gaseous fuel stream.

5 Claims, 5 Drawing Sheets

METHOD FOR DESULFURIZING A FUEL FOR USE IN A FUEL CELL POWER PLANT

This is a division of copending U.S. Ser. No. 09/104,254, filed Jun. 24, 1998.

DESCRIPTION

1. Technical Field

The present invention relates to an improved system for desulfurizing a raw hydrocarbon fuel stream so as to render the fuel suitable for use in a mobile vehicular fuel cell power plant assembly. More particularly, the desulfurizing system of this invention is operable to remove organic sulfur compounds found in the raw fuel stream to levels which will not poison the catalyst in the fuel processing section of the fuel cell power plant assembly.

2. Background of the Invention

Raw fuels, such as natural gas, gasoline, diesel fuel, naphtha, fuel oil, and like hydrocarbon fuels may not be useful as a process fuel source suitable for a fuel cell power plant due to the existence of relatively high levels of naturally-occurring complex organic sulfur compounds, or sulfur compounds added as odorants, such as mercaptans and thiophenes. Hydrogen generation in the presence of sulfur results in a poisoning effect on all of the catalysts used in the hydrogen generation system, often including the fuel cell anode catalyst. Conventional fuel processing systems used with stationary fuel cell power plants include a thermal steam reformer, such as that described in U.S. Pat. No. 5,516,344. In such a fuel processing system, sulfur is removed by conventional hydrodesulfurization techniques which typically rely on a certain level of recycle as a source of hydrogen for the process. The recycle hydrogen combines with the organic sulfur compounds to form hydrogen sulfide within a catalytic bed. The hydrogen sulfide is then removed using a zinc oxide bed to form zinc sulfide. The general hydrodesulfurization process is disclosed in detail in U.S. Pat. No. 5,292,428. While this system is effective for use in large stationary applications, it does not readily lend itself to mobile transportation applications because of system size, cost and complexity. Additionally, the gas being treated must use process recycle in order to provide hydrogen in the gas stream, as noted above.

Other fuel processing systems, such as a conventional autothermal reformer, which use a higher operating temperature than conventional thermal steam reformers, can produce a hydrogen-rich gas in the presence of the foresaid complex organic sulfur compounds without prior desulfurization. When using an autothermal reformer to process raw fuels which contain complex organic sulfur compounds, the result is a loss of autothermal reformer catalyst effectiveness and useful catalyst life of the remainder of the fuel processing system. The organic sulfur compounds are converted to hydrogen sulfide as part of the reforming process. The hydrogen sulfide can then be removed using a solid absorbent scrubber, such as an iron or zinc oxide bed to form iron or zinc sulfide. The aforesaid solid scrubber systems are limited due to thermodynamic considerations, as to their ability to lower sulfur concentrations to non-catalyst degrading levels in processing components downstream of the reformer, such as in the shift converter, or the like.

Alternatively, the hydrogen sulfide can be removed from the gas stream by passing the gas stream through a liquid scrubber, such as sodium hydroxide, potassium hydroxide, or amines. Liquid scrubbers are large and heavy, and are therefore useful principally only in stationary fuel cell power plants. From the aforesaid, it is apparent that current methods for dealing with the presence of complex organic sulfur compounds in a raw fuel stream for use in a fuel cell power plant require increasing fuel processing system complexity, volume and weight, and are therefore not suitable for use in mobile transportation systems.

An article published in connection with the 21st *Annual Power Sources Conference* proceedings of May 16–18, 1967, pages 21–26, entitled "Sulfur Removal for Hydrocarbon-Air Systems", and authored by H. J. Setzer et al, relates to the use of fuel cell power plants for a wide variety of military applications. The article describes the use of high nickel content hydrogenation catalyst to remove sulfur from a military fuel called JP-4, which is a jet engine fuel, and is similar to kerosene, so as to render the fuel useful as a hydrogen source for a fuel cell power plant. The systems described in the article operate at relatively high temperatures in the range of 600° F. to 700° F. The article also indicates that the system tested was unable to desulfurize the raw fuel alone, without the addition of water or hydrogen, due to reactor carbon plugging. The carbon plugging occurred because the tendency for carbon formation greatly increases in the temperature range between about 550° F. and about 750° F. A system operating in the 600° F. to 700° F. range, as disclosed in the article, would be very susceptable to carbon plugging, as was found to be the case in the system described in the article. The addition of either hydrogen or steam reduces the carbon formation tendency by supporting the formation of gaseous carbon compounds thereby limiting carbon deposits which cause the plugging problem.

It would be highly desirable from an environmental standpoint to be able to power electrically driven vehicles, such as an automobile, for example, by means of fuel cell-generated electricity; and to be able to use a fuel such as gasoline, diesel fuel, naphtha, lighter hydrocarbon fuels such as butane, propane, natural gas, or like fuel stocks, as the fuel consumed by the vehicular fuel cell power plant in the production of electricity. In order to provide such a vehicular power source, the amount of sulfur in the processed fuel gas would have to be reduced to and maintained at less than about 0.05 parts per million.

DISCLOSURE OF THE INVENTION

This invention relates to an undiluted fuel processing system which is operable to remove substantially all of the sulfur present in an undiluted hydrocarbon fuel stock used to power a fuel cell power plant in a mobile environment. The power plant fuel can be gasoline, diesel fuel, lighter hydrocarbon fuels, such as butane, propane, natural gas, or other similar fuels which contain relatively high levels of organic sulfur compounds such as thiophenes, mercaptans, sulfides, disulfides, and the like. The undiluted hydrocarbon fuel stock, without the use of steam or recycled gas streams, is first passed through a nickel desulfurizer bed wherein essentially all of the sulfur in the organic sulfur compounds react with the nickel reactant and are converted to nickel sulfide and desulfurized hydrocarbons which continue through the remainder of the fuel processing system. Since this desulfurizer requires no water or recycle addition, it can be made compact and simple when compared to alternate approaches, and it is not limited by thermodynamic considerations in the presence of water, as are other absorbents such as zinc or iron oxides. For example, zinc oxide, which is frequently used to remove hydrogen sulfide by the reaction:

$$ZnO + H_2S <=> ZnS + H_2O$$

cannot lower the $H_2S$ sufficiently to protect the hydrogen generation catalyst in the presence of water vapor because the reaction is thermodynamically forced from right to left. Iron oxide, which is also frequently used to remove hydrogen sulfide is plagued with the same limitation.

The desulfurized fuel is then passed in a vaporous state through a reformer, such as an autothermal reformer, for example, wherein the fuel is converted to a hydrogen-enriched fuel which is suitable for use in the anode side of the fuel cell assembly portion of the fuel cell power plant. The fuel may be desulfurized while in a gaseous state or in a liquid state. Steam for processing of the desulfurized fuel stream is provided by a steam generator. Heated ambient air and steam are used in the fuel gas reforming station. The reformed gas stream is passed through a shift converter which reduces the CO content and enriches the $H_2$ content of the gas stream; and thence through one or more stages of selective oxidizers which further reduce the CO content of the gas stream. The final processing step is an ammonia-removal step wherein ammonia is removed from the processed fuel stream prior to feeding the latter to the fuel cell assembly anodes. The fuel processing system may include a desulfurized fuel reservoir between the desulfurizer and the reformer so as to ensure that desulfurized fuel is available when the vehicle is restarted after shut-down.

It is therefore an object of this invention to provide a fuel processing system which is suitable for use in a mobile electrically-powered vehicle.

It is an additional object of this invention to provide a fuel processing system of the character described wherein a raw hydrocarbon fuel stock is desulfurized to an extent needed to produce a gaseous fuel cell power plant-compatible fuel stream.

It is a further object of this invention to provide a fuel processing system of the character described wherein the raw hydrocarbon fuel stock being desulfurized can be gasoline, diesel fuel, naphtha and/or lighter hydrocarbon fuels such as butane, propane, natural gas, or the like.

It is another object of this invention to provide a fuel processing system of the character described wherein the raw hydrocarbon fuel stock is desulfurized by reacting the raw fuel with a nickel reactant bed, which bed is operative to convert sulfur compounds in the raw fuel to nickel sulfide which is deposited on the bed, with the desulfurized hydrocarbon fuel continuing through the fuel processing system.

It is a further object of this invention to provide a fuel processing system of the character described wherein the nickel bed can capture from 2–5% of its weight in sulfur when the sulfur compounds are thiophenes, and up to 15% of its weight in sulfur, when the sulfur compounds are mercaptans.

It is yet another object of this invention to provide a sulfur scrubber unit of a size, weight and complexity that is suitable for transportation applications and allows the subsequent fuel processing equipment to be kept to a size that is usable in transportation applications.

These and other objects of the invention will become more readily apparent from the following detailed description thereof when taken in conjunction with the accompanying drawings in which:

SPECIFIC MODES FOR CARRYING OUT THE INVENTION

Figure 1:
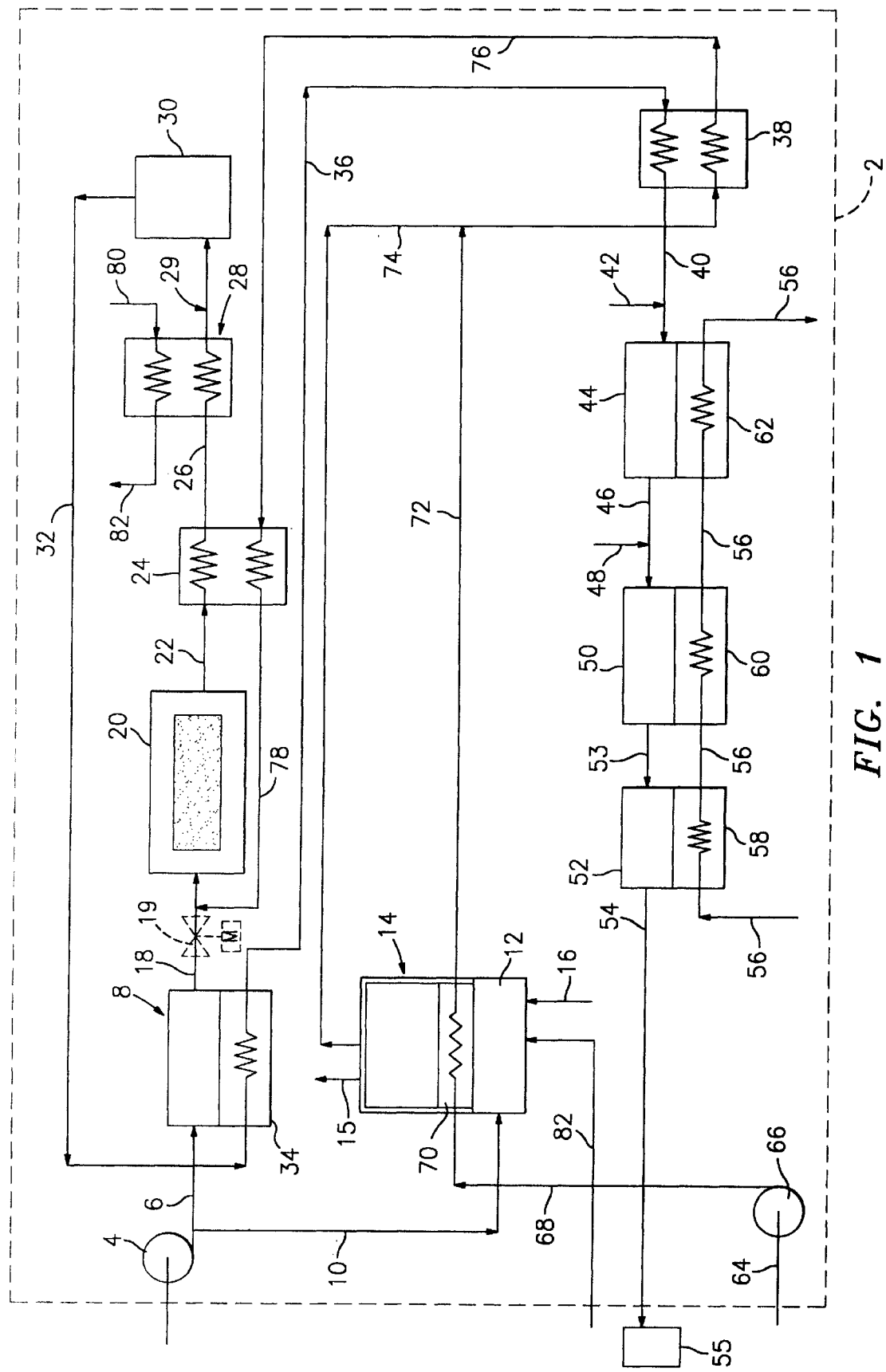
FIG. 1 is a schematic view of a first embodiment of a fuel processing system which is formed in accordance with this invention.

Referring now to the drawings, FIG. 1 is a schematic view of a fuel processing system, denoted generally by the numeral 2, which is suitable for use in a vehicle such as an automobile. The fuel being processed, as noted above, can be gasoline. A fuel pump 4 pumps the gasoline into the system 2 via line 6 which leads to a nickel desulfurizer bed 8. A branch line 10 is provided to bleed off a portion of the gasoline to feed a burner 12 in a boiler 14 which produces steam for the fuel processor system 2. The boiler 14 contains water which is converted to steam in the boiler 14. Air enters the burner 12 through line 16. The burner exhaust is flushed from the system 2 via an exhaust line 15. Organic sulfur compounds in the gasoline are broken down by the nickel reactant per the following typical reactions:

The desulfurizer 8 operates at a pressure of between ambient and about one hundred fifty psi, and a temperature of between about 200° F. and 525° F. so that gasoline entering the desulfurizer 8 at a temperature of about 75° F. (ambient) will be preheated and vaporized in the desulfurizer 8. The temperature of the desulfurized gasoline will be raised to about 375° F. when the vaporized fuel enters a passage 18 which leads to an autothermal reformer 20. The reformer 20 may be provided with an iron oxide catalyst section as described in U.S. Pat. No. 4,451,578, which is incorporated herein in its entirety Overall, the desulfurized gasoline vapor fuel gas is converted to a hydrogen-enriched fuel gas per the following representative reaction which includes a complete shift of CO to $CO_2$:

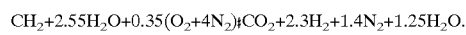

Within the reformer 20, the fuel gas reaches a thermodynamic equilibrium at 1,200° F. which produces approximately equal quantities of CO and $CO_2$ and a trace of methane. The reformer 20 operates at an inlet temperature of about 950° F. where a portion of the fuel gas stream is combusted and the remainder reformed to an $H_2$ enriched gas stream, so that the reformed gas stream enters a line 22 at a temperature of about 1,200° F. The hydrogen-enriched fuel gas passes from the line 22 into a heat exchanger 24 wherein the temperature of the fuel gas is lowered to about 760° F. The cooled gas stream passes from the heat exchanger 24 through a line 26 to a burner fuel preheater 28 wherein the temperature of the fuel gas stream is lowered to about 400° F. The cooled fuel gas stream then flows through a line 29 to a shift converter 30 wherein the CO content of the gas stream is reduced to an amount in the range of about 0.5% to about 1.0% by means of the following reaction:

$$CO+H_2O \rightarrow CO_2+H_2+heat;$$

and wherein the gas stream temperature increases to about 525° F. The treated gas stream then flows through a line 32 and through a heat exchanger 34 which controls the temperature in the desulfurizer 8. The gas stream is cooled to a temperature of about 425° F. in the heat exchanger 34 and then flows through a line 36 to a heat exchanger 38 wherein the temperature of the fuel gas stream is lowered to about 350° F. The cooled gas stream then flows through a line 40 wherein it is admixed with air introduced into the line 40 via an air inlet line 42. The amount of oxygen in the line 42 is about 1.0% of the total gas flow. The oxygenated fuel gas stream then flows through a first selective oxidizer 44 wherein the gas stream is cooled to a temperature of about 300° F. and wherein CO is removed from the gas stream via the reaction:

$$CO+\tfrac{1}{2}O_2 \rightarrow CO_2$$

The cooled and treated fuel gas stream then flows through a line 46 wherein it is again admixed with air introduced into the line 46 via an air inlet line 48. The amount of oxygen in the line 48 is about 0.35% of the total gas flow or less. The oxygenated fuel gas stream then passes through a second selective oxidizer 50 wherein the temperature of the fuel gas stream is lowered to about 170° F. and the CO content is reduced to less than 10 ppm by volume. The cooled gas stream then passes through a line 53 to an ammonia scrubber 52 which may be a phosphoric acid-impregnated carbon bed. An example of the aforesaid procedure is described in U.S. Pat. No. 4,379,036. In some circumstances, a single stage selective oxidizer using additional air and cooling, and operating in the 170° F. range could be used. At a temperature of about 170° F. the ammonia is removed from the gas stream in the scrubber 52 via the reaction:

$$3NH_3+H_3PO_4 \rightarrow (NH_4)_3PO_4.$$

Alternatively, the ammonia can be dissolved in water or reacted with the acid in an acidic polymer, such as Nafion®, to an ammonium salt such as $(NH_4)_2SO_4$. The fully treated fuel gas stream then flows through a line 54 to the anode side of a fuel cell stack assembly 55 of the fuel cell power plant where it serves as the reactant fuel for the electrochemical reaction which proceeds in the power section of the power plant.

The temperatures of the ammonia scrubber 52 and the selective oxidizers 50 and 44 are controlled by the vehicle coolant which flows through lines 56 and through heat exchangers 58, 60 and 62 which are associated with the ammonia scrubber 52 and the selective oxidizers 50 and 44 respectively. The vehicle coolant flows through the heat exchangers 58, 60 and 62 in counter direction to the gas stream so that the temperature of the coolant fluid will increase from about 160° F. at its inlet to about 270° F. at its outlet.

Autothermal reformer process air enters the system 2 via line 64 wherein it is pressurized by means of a pump 66. Air entering the system 2 is at ambient temperature of about 75° F. The air stream passes through a line 68 to a heat exchanger 70 in the boiler 14 wherein the temperature of the air stream is raised to about 225° F. The heated air passes from the heat exchanger 70 into a line 72 and flows thence to a second line 74 where it admixes with steam emanating from the boiler 14. The air-steam admixture then flows through the heat exchanger 38 wherein the temperature of the air-steam admixture is raised to about 330° F. The heated air-steam admixture then flows through a line 76, through the heat exchanger 24 where the temperature of the air-steam admixture is raised to about 950° F. The heated air-steam admixture then flows through the line 78 and into the line 18 wherein mixture of the gasoline fuel vapor and the air-steam admixture occurs. The fuel-air-steam mixture then enters the reformer 20.

Anode exhaust, which is used as an energy source, enters the burner fuel preheater 28 via line 80 at a temperature of about 120° F. The anode exhaust stream is heated to a temperature of about 700° F. in the preheater 28. The heated anode exhaust stream then flows through a line 82 to the burner 12 wherein it admixes with the air and gasoline.

The aforesaid system 2 is designed to process a vaporized fuel supply in the desulfurizer 8. The system 2 can also process a liquid fuel supply in the desulfurizer 8. When a liquid fuel supply is processed, a pressurization valve 19 (shown in phantom) will be positioned in the line 18 so as to ensure that the fuel can remain in a liquid state at the high operating temperatures of the desulfurizer 8 which may be pressurized up to about 150 psig by the fuel pump 4.

When a large increase in power is requested, the valve 19 downstream of the desulfurizer 8 can be opened to provide a high fuel flow rate. Most of the liquid fuel at the valve inlet will flash evaporate as it goes through the valve, with the remainder being evaporated by the steam, thereby providing a rapid response of gaseous fuel to the reformer 20.

Figure 2:
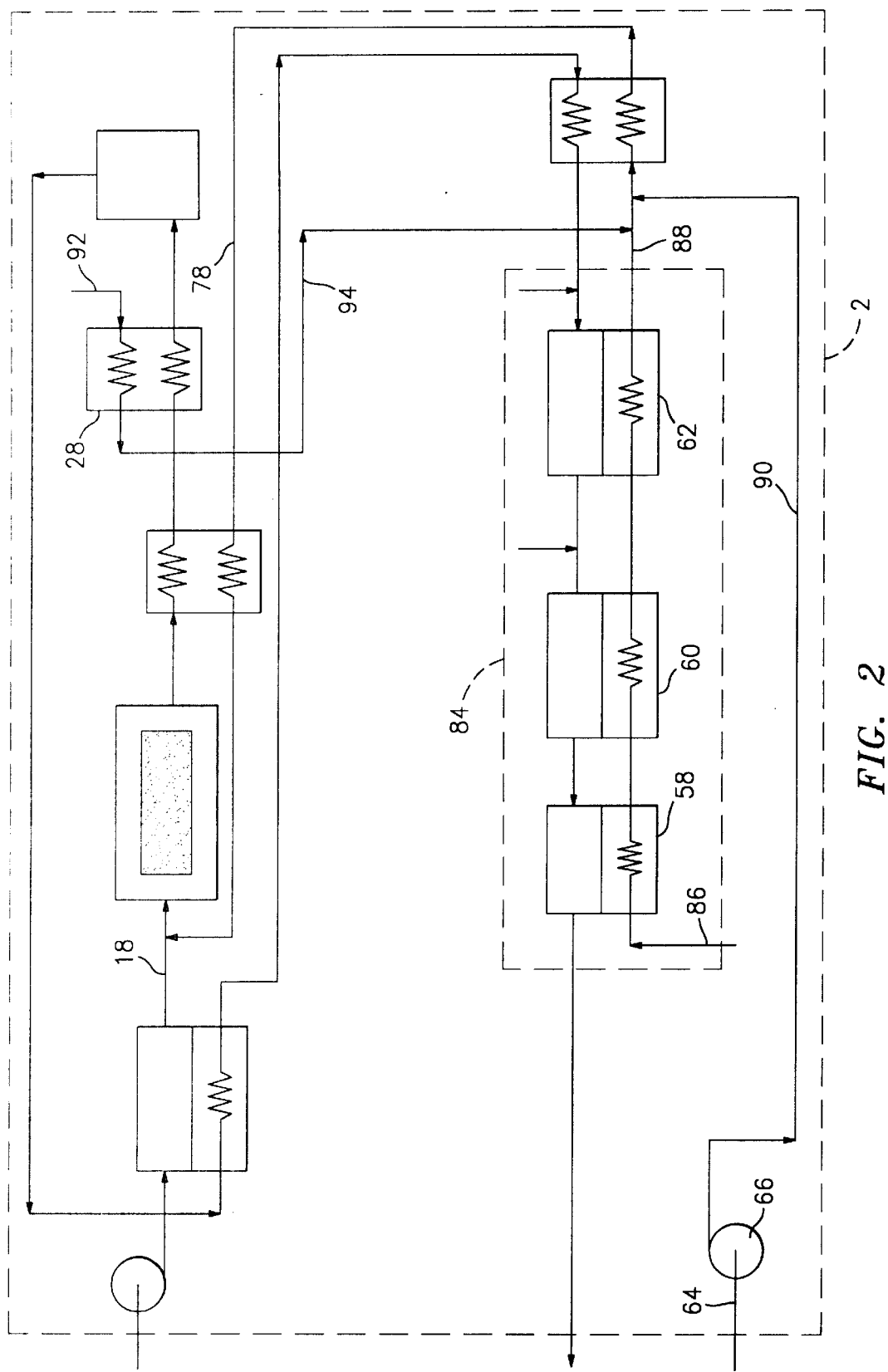
FIG. 2 is a schematic view of a second embodiment of a fuel processing system which is formed in accordance with this invention.

Referring now to FIG. 2, an alternative embodiment of the system 2 is depicted. Instead of using a boiler fueled by the fuel stock to produce the steam needed in the reformer, the system uses a first steam generator sub-assembly 84 which receives water from a line 86 and uses the heat exchangers 58, 60 and 62 to convert the water in the line 86 to steam, which steam exits the heat exchanger 62 through line 88. Ambient air is admitted to the system 2 through line 64 and pump 66 and is directed through line 90 to the line 88 wherein the air mixes with the steam in line 88. The pre-shift converter heat exchanger 28 is used as a second steam generator by passing a water stream through a line 92 through the heat exchanger 28. Steam exits from the heat exchanger 28 through line 94 and combines with the air and steam in the line 88. The combined stream then flows through the line 78 to the pre-reformer line 18, and the processing proceeds as previously described.

Figure 3:
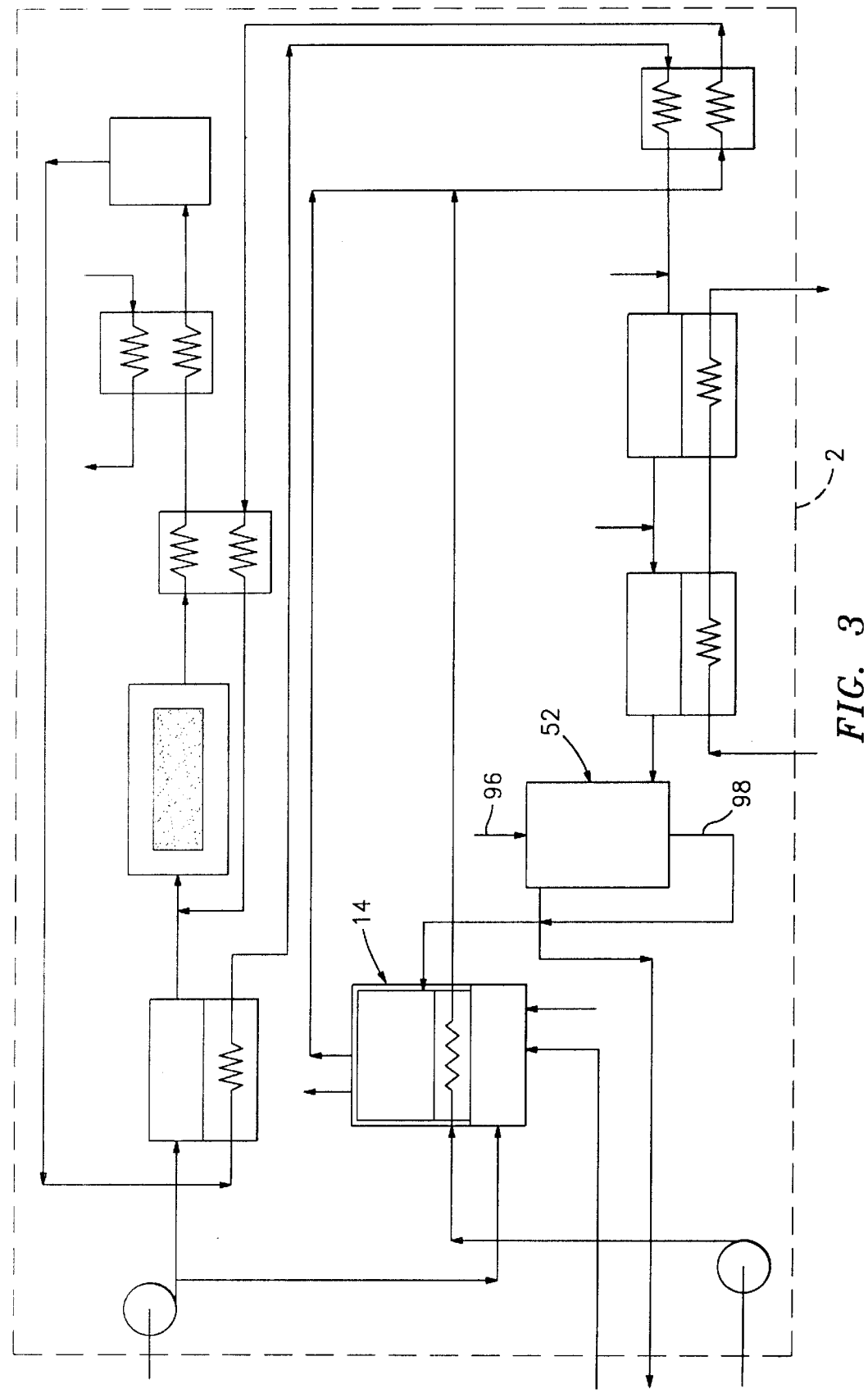
FIG. 3 is a schematic view of a third embodiment of a fuel processing system which is formed in accordance with this invention.

Referring now to FIG. 3, yet another embodiment of the system 2 is depicted. In the embodiment of FIG. 3, the ammonia scrubber 52 takes the form of a water absorbent wherein ammonia in the fuel gas stream is dissolved in water in the scrubber 52 by means of a contact cooler as generally described in U.S. Pat. No. 4,816,040. The water is admitted to the scrubber 52 through a line 96, and water with dissolved ammonia is removed from the scrubber 52 via line 98 and admitted into the boiler 14 wherein the ammonia comes to an equilibrium state in the water. Use of the aforesaid device provides the ability to control the anode gas feed temperature and gas dew point. The remainder of the system 2 operates essentially as described in connection with FIG. 1.

Figure 4:
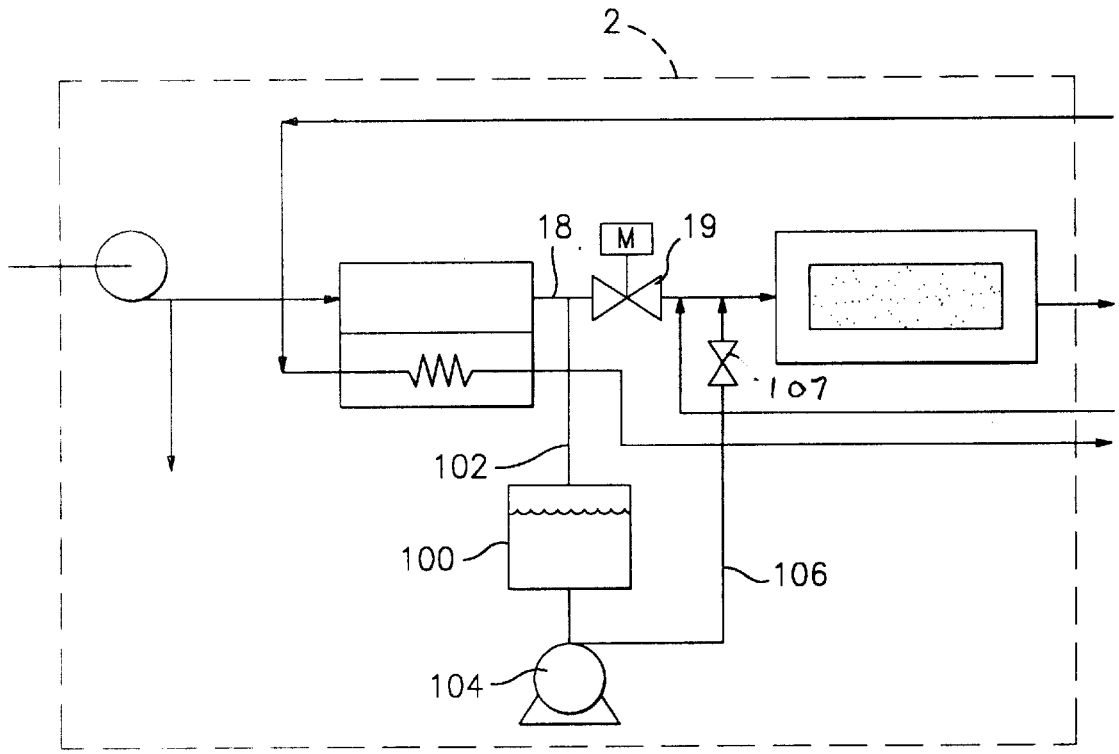
FIG. 4 is a fragmented schematic view of a portion of a fuel processing system which is formed in accordance with this invention and which provides a reserve desulfurized fuel supply for start-up of the system.
Figure 5:
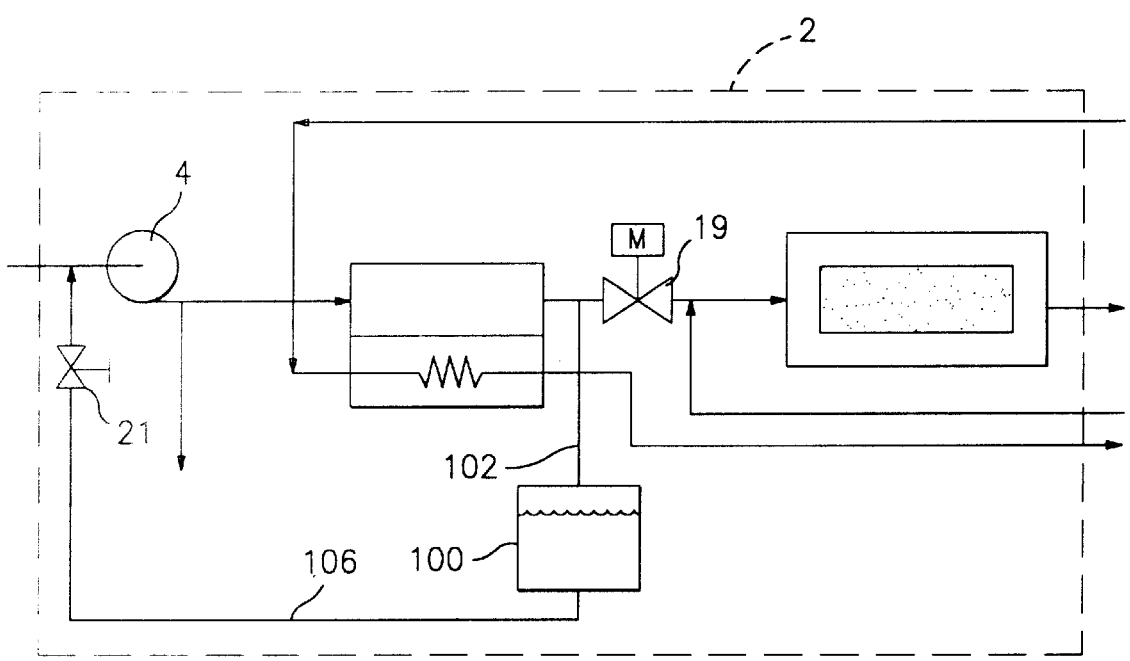
FIG. 5 is a fragmented schematic view of a portion of a fuel processing system similar to FIG. 4 but which illustrates an alternative configuration of the system for providing a reserve desulfurized fuel supply for start-up of the system.

Referring now to FIGS. 4 and 5, there are shown two variations of a portion of the system 2 wherein a reserve supply of desulfurized fuel is provided so as to enable the vehicle to be readily restarted after shut down of a previous operating cycle. The re-startup supply of desulfurized fuel is drawn off into a restart fuel tank 100 during an operating cycle of the system 2. The start up desulfurized reserve fuel supply is maintained in a liquid form in the tank 100. In both variations, the valve 19 is employed in the line 18 to maintain the liquid phase of the fuel in the tank 100, and the liquid desulfurized fuel reserve is drawn into the tank 100 through a branch line 102 which communicates with the line 18 upstream of the valve 19.

In the embodiment shown in FIG. 4, a pump 104 is provided adjacent to the tank 100 and is operative on start up to draw the desulfurized fuel from the tank 100 and pumps the fuel through a line 106 and a selectively opened valve 107 back up to the line 18 downstream of the valve 19 where the desulfurized fuel enters the reformer 20.

In the embodiment shown in FIG. 5, the pump 4 is used to draw the desulfurized fuel from the tank 100 through a line 106 after a valve 21 is opened. The pump 4 then pumps the fuel back through the desulfurizer 8, through the valve 19 and into the reformer 20.

Figure 6:
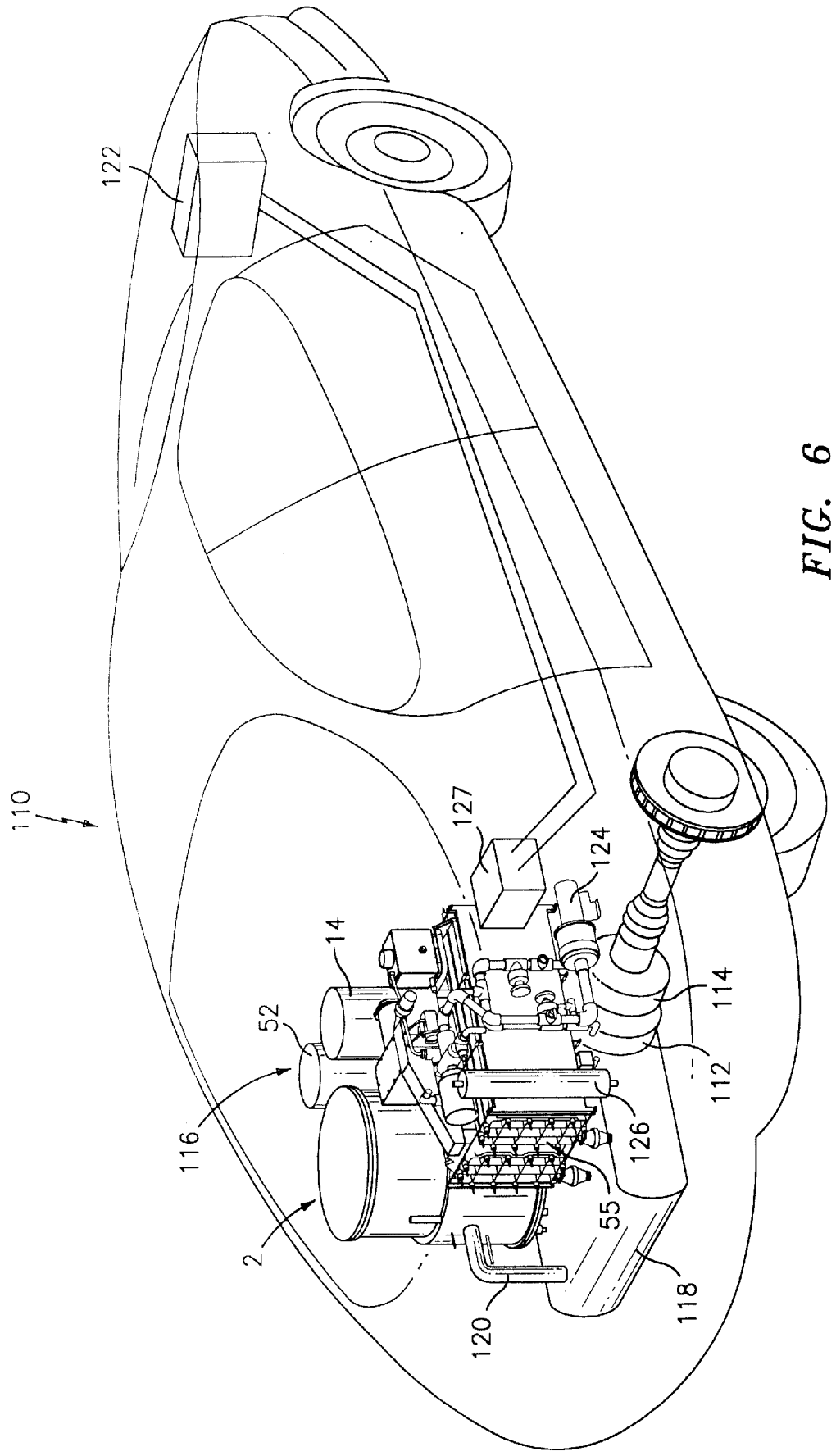
FIG. 6 is a schematic perspective view of an automobile which is equipped with an electric motor for providing power for the automobile, and a fuel cell assembly for supplying electricity to the electric motor.

FIG. 6 is a schematic illustration of an automobile, denoted generally by the numeral 110, which has been modified so as to operate with the fuel cell power plant electricity source-and-fuel-processing assembly of this invention. The automobile 110 is powered by an electric motor 112 which drives a trans-axle 114. The embodiment of the automobile 110 shown in the drawing utilizes a bi-modal source of electricity for the electric motor 112, which electricity source includes the fuel cell power plant assembly 116, and an additional source of electricity 122 which can be a storage battery, a gas-powered generator, or the like. A start-up battery 127 can also be included in the automobile to start up the components of the power system 2. It will be appreciated that the automobile 110 could utilize only the fuel cell power plant assembly 116 to provide electricity for the electric motor 112. The automobile 110 includes a fuel tank 118 having a line 120 which leads to the fuel processing assembly 2. FIG. 6 shows a layout plan for the fuel processing assembly 2, the boiler 14, the ammonia scrubber 52, the cell stack 55, and a coolant system 124 and a water demineralizer 126.

It will be readily appreciated that by using an initial nickel desulfurizer, the amount of sulfur in the processed fuel stream can be lowered to less than about 0.05 parts per million, a level which will not significantly affect the catalyst beds in the reformer, selective oxidizer, and shift converter or in the active section of the fuel cell assembly. As a result, fuels which possess relatively large percentages of organic sulfur compounds such as gasoline, diesel fuel, lighter hydrocarbon fuels such as butane, propane, and natural gas, or the like fuel stocks, can thus be safely used for extended periods of time as the hydrocarbon fuel gas reactant in a fuel cell power plant that produces electricity to operate the vehicle. It will be appreciated that the system of this invention can be used as the sole source of electricity for a vehicle or a stationary power plant, or could be used in a hybrid system which could also include batteries for electrical power or generators for electrical power in addition to the fuel cell electrical power source.

Since many changes and variations of the disclosed embodiment of the invention may be made without departing from the inventive concept, it is not intended to limit the invention otherwise than as required by the appended claims.

What is claimed is:

1. A method for desulfurizing an undiluted hydrocarbon fuel stream so as to convert the hydrocarbon fuel stream into a hydrogen-rich gas, which hydrogen-rich gas is suitable for use in a cell stack assembly in a fuel cell power plant, said method comprising the steps of:

a) providing an undiluted hydrocarbon fuel stream, said hydrocarbon fuel stream being a hydrocarbon fuel selected from the group consisting of gasoline and diesel fuel;

b) providing a nickel desulfurization station containing a nickel reactant which is operative to convert sulfur contained in organic sulfur compounds in the hydrocarbon fuel stream to nickel sulfide;

c) introducing the hydrocarbon fuel stream into said nickel desulfurization station; and d) maintaining said nickel desulfurization station at operating temperatures in the range of about 250° F. to about 525° F. during performance of the method.

2. The method of claim 1 further comprising the step of pressurizing said nickel desulfurization station so as to preserve said hydrocarbon fuel stream in a liquid state.

3. The method of claim 2 wherein said hydrocarbon fuel stream is gasoline.

4. The method of claim 2 wherein said hydrocarbon fuel stream is diesel fuel.

5. A method for treating a hydrocarbon fuel stream, said method comprising:

a) the step of providing an undiluted hydrocarbon fuel stream, said hydrocarbon fuel stream being a hydrocarbon fuel selected from the group consisting of gasoline and diesel fuel;

b) the step of providing a nickel desulfurization station containing a nickel reactant which is operative to convert sulfur contained in organic sulfur compounds in the hydrocarbon fuel stream to nickel sulfide;

c) the step of introducing the hydrocarbon fuel stream into said nickel desulfurization station; and d) the step of maintaining said nickel desulfurization station at operating temperatures in the range of about 250° F. to about 525° F. during performance of the method.

\* \* \* \* \*